April 23, 1968

L. B. WILLIAMS, JR 3,379,866

ANALYZING COMPUTER USING BRIDGE UNBALANCE TECHNIQUES

Filed June 3, 1963

INVENTOR.
LOUIS B. WILLIAMS, JR.
BY
Kelly O. Corley

INVENTOR.
LOUIS B. WILLIAMS, JR.
BY
Kelly O. Corley 3,379,866
ANALYZING COMPUTER USING BRIDGE UNBALANCE TECHNIQUES
Louis B. Williams, Jr., Pensacola, Fla., assignor to Monsanto Company, St. Louis, Mo., a corporation of Delaware
Continuation-in-part of application Ser. No. 253,217, Jan. 22, 1963. This application June 3, 1963, Ser. No. 285,015
11 Claims. (Cl. 235—179)

The present invention concerns an analyzer or computer which determines the relationship between two input variables in terms of electrical quantities and which determines when the observed relationship departs from a given preset relationship.

This application is a continuation-in-part of application Serial No. 253,217, entitled "Ratio Analyzing Apparatus and Method," filed Jan. 22, 1963.

Occasions arise wherein it is desired to determine when the relationship between two quantities varies outside of a given range. As an example, certain quality control or inspection plans are used to maintain a given quality level with a minimum of actual inspection. A typical plan involves sequential sampling wherein individual units of a lot are inspected for conformity to given quality standards. It may be desired to reject the entire lot if the "reject" level is discovered by such sequential sampling to be too high, and to pass the lot if rejects are below a certain lower level.

The present invention is illustrated in such an environment, although the applications for the herein disclosed method and apparatus are not so limited.

Accordingly, a primary object of the invention is to provide an electrical analyzer for comparing two observed input variables with a predetermined relationship;

A further object is to provide an analyzer of the above character which determines when the observed relationship departs from the predetermined relationship;

A further object is to provide an analyzer wherein the predetermined relationship may be readily varied;

A further object is to provide an analyzer which is simple, reliable in operation and economical.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a more complete understanding of the nature and objects of the invention, reference should be made to the following detailed description taken in connection with the accompanying drawings, in which.

Figure 1:
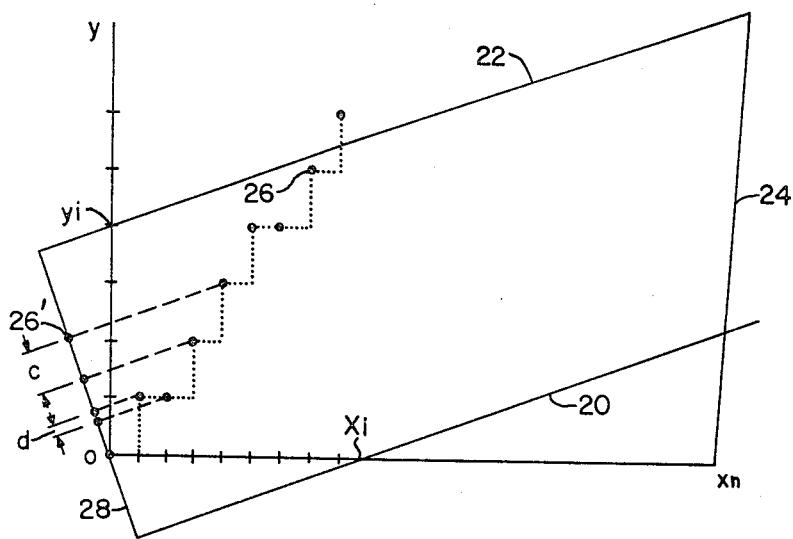
FIGURE 1 is a graph illustrating the theory of the invention.

Referring now to FIGURE 1 there is illustrated a graphic representation of a typical sequential sample quality control plan. As shown therein the X axis is laid out along the abscissa and the Y axis is laid out along the ordinate, the axes intersecting at the origin. A pair of parallel lines 20 and 22 are laid out on the graph with intercepts at $X_1$ and $Y_1$. The X axis is laid off to a scale representing the number of units inspected, while the Y axis is laid off to a scale representing the number of unacceptable or rejected items. $X_n$ represents the total number of units in a given lot. A line 24 vertical to the X axis and intersecting the X axis at $X_n$ completes the graph. The slopes of lines 20 and 22, the intercepts $X_1$ and $Y_1$, the value of $X_n$ and other characteristics are determined by well known statistical methods and procedures.

The use of the FIGURE 1 chart may be demonstrated by the following considerations. Consider a point 26 starting at the origin and movable horizontally to the right in increments of X and movable vertical in increments of Y, as in the exemplary path shown in dotted lines. If a unit is inspected and found acceptable, the point 26 moves horizontally to the right one X unit. If a unit is inspected and rejected, the point moves horizontally to the right one X unit and vertically upward one Y unit. This is repeated for each unit inspected until the point reaches or crosses one of the lines 20, 22 or 24. The region below and to the right of line 20 may be considered as the "accept" region, the region above and to the left of line 22 is the "reject" region and the area between lines 20 and 22 is an area of "indecision," which requires further sampling before a decision is reached. If point 26 crosses line 22, the entire lot would be rejected without further inspection since the number of rejected units exceeds the number permitted by the graph. Conversely, if point 26 crosses line 20, the entire lot would be accepted without further sampling. As long as point 26 remains in the region between lines 20 and 22, sampling is continued; and if point 26 remains in the area of indecision until line 24 is reached, the lot will have been 100 percent inspected. Note that the area between lines 20 and 22 represents an area of indecision and determines the permissible range of variation permitted between accepted and rejected units before a decision is made to either reject or accept the entire lot.

While the FIGURE 1 sampling plan could be administered with printed charts by physically plotting the movement of point 26 after each unit is sampled, such a procedure would be costly, time consuming and difficult, as well as susceptible to errors. The present invention provides for administering the sampling plan by feeding into a computer signals corresponding to the accepted and rejected units, the decision to accept, reject or continue sampling being made by the computer in accordance with the preselected plan.

Still referring to FIGURE 1, a further line 28 may be constructed through the origin normal to lines 20 and 22. From each position of point 26, a projection 26' may be made to line 28 as shown by dashed lines which extend parallel to lines 20 and 22. This projection 26' moves along line 28 toward line 22 a distance $e$ each time point 26 moves to represent a rejected unit, and moves along line 28 away from line 22 a distance $d$ each time point 26 moves to represent an accepted unit. Thus the position of projection 26' with respect to the origin is determined by sequentially, algebraically adding negative $c$ units and positive $d$ units corresponding to the sequence of movement of point 26.

According to the present invention, apparatus is provided which includes an electrical analog of the position of projection 26' on the graph. In a particular embodiment, electrical resistance is incrementally added and subtracted to a circuit to correspond to the movement of projection 26'.

Figure 2:
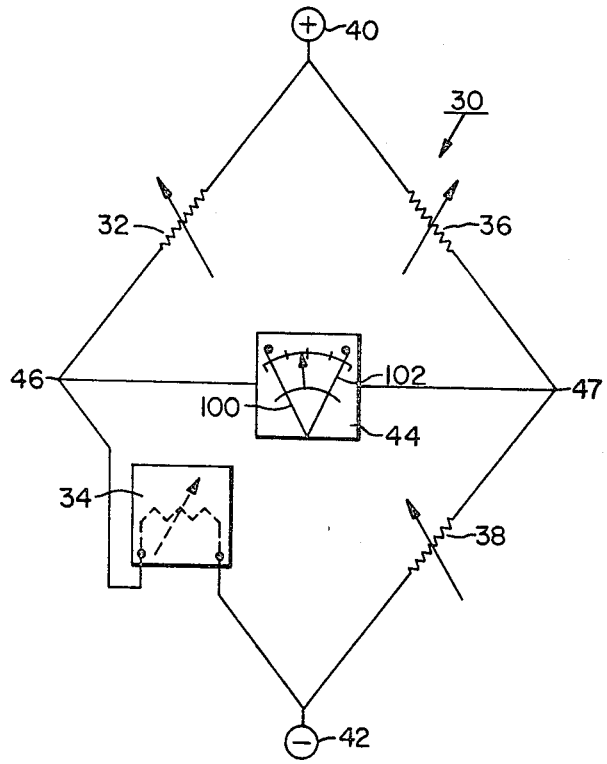
FIGURE 2 is a schematic circuit diagram of a bridge arrangement according to one aspect of the present invention.

Referring now to FIGURE 2, there is illustrated an electrical bridge circuit 30 comprising four impedances 32, 34, 36 and 38, arranged as illustrated to form an electrical bridge. These impedances are illustrated as resistors to simplify the following discussion. A power supply having a positive terminal 40 and a negative terminal 42 is connected across a first bridge diagonal, and a load impedance 44 is connected across the opposite bridge diagonal. Load 44 should be of the type which responds to either of two different conditions of bridge unbalance, such as two different voltages appearing between terminals 46 and 47. For example, load 44 may be a meter relay.

Generally, bridge 30 is adjusted to some initial balanced condition by adjustment of resistors 32, 36 and 38, after which resistor 34 is varied as the electrical analog of the position of projection 26' on the graph.

Figure 3:
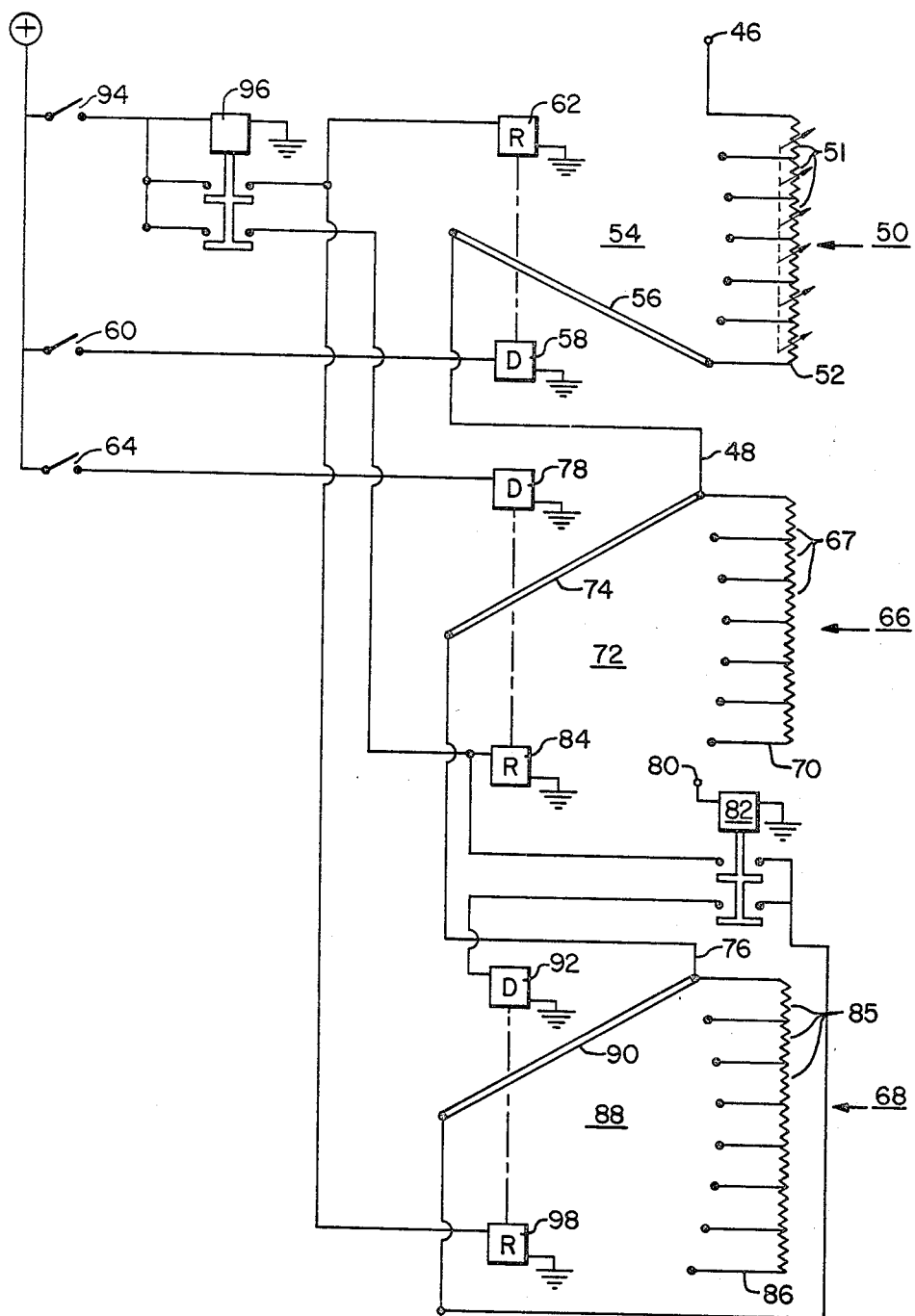
FIGURE 3 is a schematic circuit diagram of an exemplary variable impedance which may be used in the FIGURE 2 circuit.

An exemplary variable resistor unit 34 of this character is illustrated in FIGURE 3, wherein the resistance between terminals 42 and 46 is controlled as will now be explained. The total resistance between terminals 42 and 46 is the sum of two separate components: the resistance between terminal 46 and intermediate terminal 48, which component is decreased incrementally with each reject signal, and the resistance between intermediate terminal 48 and terminal 42, the latter component being increased incrementally with each accept signal.

The first of these components is provided by a bank 50 of identical resistors 51 connected in series between terminals 46 and 52, the junctions between the several resistors 51 and terminals 46 and 52 being connected to the fixed contacts on a stepping switch 54. Wiper arm 56 of stepping switch 54 is connected to intermediate terminal 48. Arm 56 is thus arranged to sequentially by-pass one of the resistors 51 upon each energization of its drive winding 58 by closure of accept switch 60, thus decreasing the total resistance between terminals 46 and 48. A reset winding 62 provides for resetting arm 56 to the restored position illustrated in FIGURE 3.

As noted above the second component of resistor 34 appears between terminals 48 and 42, and is incrementally increased a fixed amount upon each actuation of accept switch 64. For illustrative purposes, the second component is disclosed as composed of two resistor banks 66 and 68. Bank 66 includes a series of resistors 67 of equal value connected in series between terminal 48 and a terminal 70, the terminals 48 and 70 and the junctions between the several resistors 61 being connected to fixed contacts of a stepping switch 72. Wiper arm 74 of stepping switch 72 is connected to the end terminal 76 of bank 68. Wiper arm 74 is arranged to step from one contact to the next upon each actuation of drive coil 78, thus inserting an additional one of the resistors 67 in series between terminal 76 and terminal 48 for each actuation of accept switch 64. The last contact 80 of stepping switch 72 is connected to the winding of a range multiplier relay 82. When wiper 74 engages contact 80, multiplier relay 82 energizes, connecting reset winding 84 of stepping switch 72 to power supply terminal 42 and resetting stepping switch 72 to the restored position illustrated.

Bank 66 includes a series of identical resistors 85 connected in series between terminal 76 and an end terminal 86, the end terminals 76 and 86 and the junctions between the several resistors 85 being connected to fixed contacts of a stepping switch 88. The wiper arm 90 of switch 88 is connected to power supply terminal 42. The drive winding 92 of stepping switch 88 is energized through auxiliary contacts on multiplier relay 82 when relay 82 is energized.

Thus each time that arm 74 has inserted the entire number ($n$) of resistors in bank 66 in series between terminal 48 and terminal 42, the next actuation of accept switch 64 steps arm 74 to contact 80, energizing multiplier relay 82. Relay 82 then resets switch 72 to its restored position and inserts one of the resistors of bank 68 in series between terminals 48 and 42 in place of bank 66. If the resistors 85 each have a value equal to $n+1$ times the value of one of resistors 67, the range of increasing resistance available between terminals 48 and 42 is multiplied by the number of resistors in bank 68.

The entire apparatus may be reset by closing reset switch 94, which energizes reset relay 96. A first set of contacts on relay 96 energizes reset winding 84 on stepping switch 72, while a second set of contacts simultaneously energizes reset winding 62 of stepping switch 54 and reset winding 98 of stepping switch 88. It is particularly noted that the provision of separate contacts on relay 96 for winding 84 permits isolation of winding 84 from reset windings 58 and 98. Thus switch 72 may be reset by relay 82 without resetting switches 54 and 88.

Referring now to FIGURES 1, 2 and 3 generally, according to the present invention the resistance of resistor 34 in FIGURE 2 (appearing between terminals 46 and 42 in FIGURE 3) may be made to correspond to the position of projection 26' in FIGURE 1 by selection of the appropriate ratio between the resistance of the resistors 51 in bank 50 to the resistance of the resistors 67 in bank 66. Thus, the resistance of each resistor 51 should have the same relationship to the resistance of each resistor 67 as distance $c$ does to distance $d$ in FIGURE 1. This adjustment may conveniently be accomplished by "ganging" the controls of the resistors 51, which preferably are variable for this purpose. The value of resistor 34 when the FIGURE 3 apparatus is reset corresponds to the position of projection 26' at the origin in FIGURE 1. The different degrees of unbalance to which load 44 responds correspond to the lines 20 and 22 in FIGURE 1, and if load 44 is a meter relay as illustrated, are readily adjusted by movement of the adjustable contacts 100 and 102 on the meter relay. Individual indicator or control apparatus may be connected to contacts 100 and 102 if desired, since each will represent, when contacted by the meter needle, crossing of a respective one of lines 20 and 22 by point 26. Alternatively, contacts 100 and 102 may be connected to a common output apparatus if it is only desired to indicate that point 26 is no longer in the area of indecision.

With the FIGURES 2 and 3 apparatus adjusted as described above to correspond to a desired sampling plan, such as the one illustrated in FIGURE 1, the operation of the apparatus may be described as follows. For each unacceptable item, switch 60 will be closed, actuating drive winding 58 on stepping switch 54, thus decreasing the total resistance presented by bank 50 by the value of one resistor 51 corresponding to the distance $c$ in FIGURE 1. For each acceptable unit, switch 64 is closed, actuating drive winding 78 on stepping switch 72, causing wiper arm 74 to step to the next contact. This inserts one of the resistors 67 (corresponding to the distance $d$) in series between terminals 42 and 46. Repeated actuation of switch 64 results in wiper arm 74 contacting terminal 70. Upon the next actuation of switch 64, wiper arm 74 steps to its last contact 80, actuating multiplier relay 82. Through a first set of contacts on relay 82, reset winding 84 on stepping switch 72 is energized, resetting wiper arm 74 to its restored position as illustrated in FIGURE 3. The remaining set of contacts on relay 82 energizes drive winding 92 on stepping switch 88, which drives its associated wiper arm 90 to the next fixed contact, inserting one of the resistors in bank 68 in series between terminals 46 and 42. As noted above, each of the resistors 85 in bank 68 are selected to have a resistance value equal to $n+1$ times the value of the individual resistors in bank 66, wherein $n$ represents the number of resistors in bank 66. Actuation of switches 60 and 64 may thus be seen to vary the total resistance appearing between terminals 42 and 46 according to the position of projection 26' in the FIGURE 1 graph.

While the preferred measuring circuit for determining the value of variable resistor 34 has been illustrated as an electrical bridge, this is not essential in all aspects of the invention. Other circuits may be used for determining this quantity, such as a conventional ohmmeter, so long as the selected measuring circuit responds to two different values of resistance of resistor 34 corresponding to lines 20 and 22 in FIGURE 1. While only the accept network appearing between terminals 48 and 42 has been specifically disclosed as including a plurality of resistor banks to provide the range multiplier feature, it is within the scope of the invention to provide such a multiplier feature in association with bank 50. It is not essential to all aspects of the invention that the accept network between terminals 48 and 42 include the multiplier feature if enough contacts and resistors 67 are provided on stepping switch 72. Furthermore, while the above disclosure has been directed specifically to electrical resistors as the impedances which are added and subtracted, other impedances may be used in a similar arrangement. Alternating current power supplies may be used instead of the direct current supplies disclosed above. The controls illustrated as manual switches 60, 64 and 94 may be replaced by automatically actuated signal sources if desired.

Accordingly there has been disclosed in the above specification and the accompanying drawings an analyzer which determines the relationship between two input variables in terms of electrical quantities and which determines when the observed relationship departs from a given preset relationship. In the preferred embodiment, the variable impedance comprises two components, one of which is increased in accordance with the first input quantity and the other which is decreased in accordance with the other input quantity. Advantageously the total variation in impedance is determined by an electrical bridge arrangement. The disclosed apparatus permits ready adjustment in order to conform with a desired inspection plan, by appropriate adjustment of the contacts 100 and 102 on meter relay 44 and of the several impedances as above described. The disclosed apparatus is simple, reliable in operation and economical.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A circuit comprising in combination:
   (a) first, second, third and fourth impedances connected to form a bridge, said first impedance having an intial reset value,
   (b) a power supply connected across a first diagonal of said bridge,
   (c) first control means for increasing the value of said first impedance by a given increment in response to each ocurrence of a first signal,
   (d) second control means for decreasing the value of said first impedance a different increment in response to each occurrence of a second signal,
   (e) and a load connected across the second diagonal of said bridge, said load including means responsive to an increase in the value of said first impedance beyond a preset given amount in excess of said reset value, and responsive to a decrease in the value of said first impedance beyond a different given preset amount less than said reset value.

2. The circuit defined in claim 1 wherein said load includes a meter relay.

3. The circuit defined in claim 1, further comprising resetting means for restoring said first impedance to a control value.

4. The circuit defined in claim 1, further comprising means for adjusting the ratio of said given increment to said different increment.

5. A circuit comprising in combination:
   (a) a first bank of impedances connected in series between first and second terminals, the impedances in said first bank being identical to one another,
   (b) a second bank of impedances connected in series between third and fourth terminals, the impedances in said second bank being identical to one another,
   (c) first stepping switch means, normally connecting said third terminal to said second terminal in reset position, for by-passing one of the impedances in said first bank in response to each occurrence of a first signal,
   (d) a fifth terminal,
   (e) second stepping switch means, normally connecting said fifth terminal to said third terminal in a reset position, for sequentially switching one of the impedances in said second bank in series between said fifth and said third terminals in response to each occurrence of a second signal,
   (f) and output means responsive to variations of the total impedance between said first and said fifth terminals, said output means including means responsive to an increase in the value of said total impedance beyond a preset given amount in excess of a reset value, and responsive to a decrease in the value of said total impedance beyond a different given preset amount less than said reset value.

6. The circuit defined in claim 5 wherein the impedances in at least one of said banks may be varied.

7. The circuit defined in claim 6 wherein the impedances in at least one bank are ganged for simultaneous variation.

8. The circuit defined in claim 5, further comprising resetting means for restoring said stepping switch means to a restored position.

9. The circuit defined in claim 5 wherein said impedances are resistors.

10. The circuit defined in claim 5, further comprising range multiplier means for multiplying the effective range of variation of one of said banks of impedances.

11. A circuit comprising in combination:
   (a) first control means for increasing an electrical parameter by a given increment in response to each occurrence of a first signal,
   (b) second control means for decreasing said parameter by a difference increment in response to each occurrence of a second signal.
   (c) and output means responsive to variation of the value of said parameter, said output means including means responsive to an increase in the value of said parameter beyond a preset given amount in excess of a reset value, and responsive to a decrease in the value of said parameter beyond a different given preset amount less than said reset value.

References Cited

UNITED STATES PATENTS

| | | | |
|---|---|---|---|
| 2,618,209 | 11/1952 | Silent | 235—179 X |
| 2,630,007 | 3/1953 | Howe et al. | |
| 3,082,373 | 3/1963 | Hooke et al. | 235—151.13 X |
| 3,181,061 | 4/1965 | Schneider | 235—179 |
| 3,202,808 | 8/1965 | Meixell | 235—179 X |
| 3,211,991 | 10/1965 | Potter | 235—179 X |
| 3,218,445 | 11/1965 | Fluegel | 235—179 X |

MALCOLM A. MORRISON, *Primary Examiner.*

I. KESCHNER, *Assistant Examiner.*